(12) United States Patent
Nice et al.

(10) Patent No.: US 8,739,289 B2
(45) Date of Patent: May 27, 2014

(54) HARDWARE INTERFACE FOR ENABLING DIRECT ACCESS AND SECURITY ASSESSMENT SHARING

(75) Inventors: Nir Nice, Kfar Veradim (IL); Lee F. Walker, Christiansburg, VA (US)

(73) Assignee: Microsoft Corporation, Redmond, WA (US)

( * ) Notice: Subject to any disclaimer, the term of this patent is extended or adjusted under 35 U.S.C. 154(b) by 884 days.

(21) Appl. No.: 12/144,863

(22) Filed: Jun. 24, 2008

(65) Prior Publication Data

US 2009/0254984 A1    Oct. 8, 2009

Related U.S. Application Data

(60) Provisional application No. 61/042,691, filed on Apr. 4, 2008.

(51) Int. Cl.
*H04L 9/00* (2006.01)
*H04L 29/06* (2006.01)

(52) U.S. Cl.
CPC ................................. *H04L 63/0485* (2013.01)
USPC .......................................................... 726/25

(58) Field of Classification Search
USPC .......................................................... 726/25
See application file for complete search history.

(56) References Cited

U.S. PATENT DOCUMENTS

| | | | |
|---|---|---|---|
| 5,359,709 A * | 10/1994 | Blanc et al. .................... | 375/222 |
| 6,430,545 B1 * | 8/2002 | Honarvar et al. ............... | 706/47 |
| 6,708,219 B1 | 3/2004 | Borella et al. | |
| 6,795,917 B1 | 9/2004 | Ylonen | |
| 7,032,242 B1 | 4/2006 | Grabelsky et al. | |
| 7,143,188 B2 | 11/2006 | Maufer et al. | |
| 7,178,166 B1 * | 2/2007 | Taylor et al. .................... | 726/25 |
| 7,245,622 B2 | 7/2007 | Huitema | |
| 7,283,540 B2 | 10/2007 | Hamamoto et al. | |
| 7,305,480 B2 | 12/2007 | Oishi et al. | |
| 7,324,547 B1 | 1/2008 | Alfieri et al. | |

(Continued)

FOREIGN PATENT DOCUMENTS

| | | |
|---|---|---|
| JP | 9-204385 | 8/1997 |
| JP | 2010-521749 | 6/2010 |
| KR | 20070121323 A | 12/2007 |
| KR | 1020070121323 A | 12/2007 |

OTHER PUBLICATIONS

"International Search Report", mailed Aug. 27, 2009, Application No. PCT/US2009/036410, pp. 1-10.

(Continued)

*Primary Examiner* — William Goodchild
(74) *Attorney, Agent, or Firm* — Ben Tabor; Kate Drakos; Micky Minhas (57) ABSTRACT

Native IPv6 capabilities are provided to an IPv4 network node, device, or endpoint using a hardware interface that supports network communication under a Direct Access model. The Direct Access model supports IPv6 communication with IPsec and enforces Network Access Protection ("NAP") health requirement policies for endpoints that are network clients. A Direct Access-ready server is enabled using a hardware interface that implements IPv4 to IPv6 translation and optionally IPsec termination capability. A Direct Access-ready client is enabled using a hardware interface that implements IPv4 to IPv6 translation, IPsec termination capability, and which optionally provides NAP (Network Access Protection) capabilities for Direct Access-ready clients that are configured as mobile information appliances. The hardware interface may be implemented as a network interface card ("NIC") or as a chipset.

19 Claims, 10 Drawing Sheets

(56) References Cited

U.S. PATENT DOCUMENTS

| | | | |
|---|---|---|---|
| 7,340,746 B2 | 3/2008 | Deshpande | |
| 7,356,045 B2 | 4/2008 | Satapati et al. | |
| 7,451,488 B2* | 11/2008 | Cooper et al. | 726/25 |
| 2002/0104021 A1* | 8/2002 | Gross | 713/201 |
| 2002/0154624 A1* | 10/2002 | Oishi et al. | 370/350 |
| 2005/0015626 A1* | 1/2005 | Chasin | 713/201 |
| 2005/0050334 A1* | 3/2005 | Liang et al. | 713/188 |
| 2006/0031938 A1* | 2/2006 | Choi | 726/25 |
| 2006/0112272 A1* | 5/2006 | Morioka et al. | 713/171 |
| 2006/0253701 A1* | 11/2006 | Kim et al. | 713/153 |
| 2006/0256716 A1 | 11/2006 | Caci | |
| 2009/0291634 A1* | 11/2009 | Saarisalo | 455/41.1 |

OTHER PUBLICATIONS

Jankiewicz, et al., "IPv6 Translation for IPv4 Embedded Systems", Publication Date: Oct. 17-20, 2005, 5 pages.

Nakajima, et al., "IPv4/IPv6 Translation Technology", Fujitsu Sci. Tech. J., 40, 1, page 159-169 (Jun. 2004).

Chen, et al., "Design and Implementation of a Video-Oriented Network-Interface-Card System", 2003 p. 559-560.

Notice of Rejection mailed Jan. 29, 2013 in connection with corresponding Japanese Application No. 2011-503010, with English language translation (6 pages).

* cited by examiner

HARDWARE INTERFACE FOR ENABLING DIRECT ACCESS AND SECURITY ASSESSMENT SHARING

STATEMENT OF RELATED APPLICATION

This application claims the benefit of U.S. Provisional Patent Application Ser. No. 61/042,691, filed Apr. 4, 2008, entitled "Hardware Interface for Enabling Direct Access and Security Assessment Sharing" the disclosure of which is incorporated by reference with the same effect as if set forth at length herein.

BACKGROUND

While the Internet continues its unprecedented exponential growth, the recent broad adoption of always-on broadband technologies such as Digital Subscriber Line ("DSL") and cable modems, coupled with the pending integration of personal data assistants ("PDAs") and mobile phones into always-addressable mobile information appliances, significantly elevates the urgency to expand the address space that Internet-connected systems use to communicate. The address space currently used is defined as part of the Internet Protocol, or the IP (the network layer of the TCP/IP (Transport Control Protocol/Internet Protocol) protocol suite. The version of IP commonly used today is Version 4 ("IPv4"), which has not been substantially changed since RFC 791 (Request for Comments under the Internet Engineering Task Force, or "IETF") was published in 1981. Over that time, IPv4 has proven to be robust, easily implemented and interoperable, and has stood the test of scaling an internetwork (a network of networks) to a global utility the size of today's Internet. While this is a tribute to its initial design, moving forward to an even grander scale requires laying a new foundation.

IPv6 will continue the tradition of the IPv4 protocol, which gained much of its acceptance by defining mechanisms to tie systems together over a wide variety of disparate networking technologies. Already defined link-layer mappings for transporting IPv6 include Ethernet, Point-to-Point Protocol ("PPP"), Fiber Distributed Data Interface ("FDDI"), Token Ring, Asynchronous Transfer Mode ("ATM"), Frame Relay, IEEE 1394 (Institute of Electrical and Electronics Engineers), and IPv4. From the architectural perspective, an IPv4-based infrastructure appears to IPv6-enabled systems as a single segment non-broadcast multi-access ("NBMA") network. The capability to send IPv6 traffic over existing IPv4 networks will provide an initial reach as broad as the current Internet, limited only by the endpoints' ability and readiness to make use of it.

To address concerns about security and privacy, IPv6 includes IP layer security known as Internet Protocol security (IPsec). IPsec is an industry standard security technology that provides for data authenticity and integrity as well as data confidentiality across the array of protocols used by the various applications. Providing the capability at the network layer frees the developer from having to add specific security capabilities to every application.

New capabilities such as scoped addresses (useful for restricting the default range of file and printer sharing), stateless autoconfiguration (lowering the complexity and management burden), and mandatory IP security (permitting end-to-end data authentication and integrity and privacy of connections) are expected to drive rapid adoption. In addition to the new capabilities, the technologies currently used to extend the lifetime of IPv4—such as Network Address Translators ("NATs")—frequently break existing applications, and are already restricting the flexibility to deploy new ones. NATs are popular today because they allow multiple systems to share a single scarce public IPv4 address, but in doing so they tend to enforce a client/server usage model where the client uses private address space with only the server existing in public address space. IPv6 brings back the capability of "end-to-end control of communications" making networking applications simpler as the network again becomes transparent.

The conversion from IPv4 to IPv6 is anticipated to be a larger task for the industry than the preparation for Year 2000. It will affect nearly all networked applications, end-systems, infrastructure systems, and network architectures. It is critical that this change be approached with responsibility to prevent costly unproductive missteps that result from broad premature availability of technologies. Unlike the Year 2000 issue, the conversion to IPv6 has no specific timeline. However, as noted earlier, the rate of IPv4 address consumption is rapidly increasing. Simplicity of deployment will be the key to rapid adoption.

The migration of IPv4 to IPv6 will not happen overnight. There will be a period of transition when both protocols are in use over the same infrastructure. To address this transition period, the designers of IPv6 have created technologies and address types so that IPv6 nodes can communicate with each other in a mixed environment, even if they are separated by an IPv4-only infrastructure.

RFC 2893 defines a variety of different node types. An IPv4-only node implements only IPv4 (and has only IPv4 addresses) and does not support IPv6. Most hosts and routers installed today are IPv4-only nodes.

An IPv6-only node implements only IPv6 (and has only IPv6 addresses) and does not support IPv4. This node is only able to communicate with IPv6 nodes and applications. This type of node is not common today, but might become more prevalent as smaller devices such as cellular phones and handheld computing devices include the IPv6 protocol.

An IPv6/IPv4 node implements both IPv4 and IPv6.

An IPv4 node implements IPv4. An IPv4 node can be an IPv4-only node or an IPv6/IPv4 node.

An IPv6 node implements IPv6. An IPv6 node can be an IPv6-only node or an IPv6/IPv4 node.

For coexistence to occur, the largest number of nodes (IPv4 or IPv6 nodes) can communicate using an IPv4 infrastructure, an IPv6 infrastructure, or an infrastructure that is a combination of IPv4 and IPv6. True migration is achieved when all IPv4 nodes are converted to IPv6-only nodes. However, for the foreseeable future, practical migration is achieved when as many IPv4-only nodes as possible are converted to IPv6/IPv4 nodes. IPv4-only nodes can communicate with IPv6-only nodes only when using an IPv4-to-IPv6 proxy or translation gateway.

While such gateways can often perform satisfactorily, they often represent an additional expense compared with native IPv6 implementations. And because the IPv4-to-IPv6 proxy or translation gateway needs to terminate the IPsec connection for encrypted traffic before translation can be performed, the link between the gateway and IPv4 infrastructure can pose a security vulnerability in some cases. In addition, use of the gateway typically causes confusion in a given domain with regard to Domain Name System ("DNS") infrastructure because the IPv4 infrastructure will register with DNS servers in the domain as an IPv4 server, for example, even though the gateway supports IPv6. Upgrading DNS infrastructure to deal with mixed IPv4/IPv6 capabilities is not a trivial undertaking and represents additional costs.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Native IPv6 capabilities are provided to an IPv4 network node, device, or endpoint (collectively referred to as endpoint) using a hardware interface that supports network communication under a Direct Access model. The Direct Access model supports IPv6 communication with IPsec and enforces Network Access Protection ("NAP") health requirement policies for endpoints that are network clients. A Direct Access-ready server is enabled using a hardware interface that implements IPv4 to IPv6 translation and optionally IPsec termination capability. A Direct Access-ready client is enabled using a hardware interface that implements IPv4 to IPv6 translation, IPsec termination capability, and that optionally provides NAP (Network Access Protection) capabilities for Direct Access-ready clients that are configured as mobile information appliances. The hardware interface may be implemented as a network interface card ("NIC") or as a chipset.

The Direct Access hardware interface advantageously enables non-Direct Access-ready devices including legacy and non-Windows-based devices to be readily upgraded with native IPv6 capabilities at low cost with enhanced security and without modifications or changes to the installed software. In addition, for servers, using the Direct Access hardware interface eliminates the DNS confusion in a domain that is ordinarily generated by the use of an IPv4 to IPv6 gateway.

In an illustrative example, the Direct Access hardware interface is further configured to provide Enterprise Security Assessment Sharing ("ESAS") capabilities to an IPv4 endpoint. Here, a semantic abstraction, called a security assessment, is used to enable sharing of security-related information among different ESAS-enabled endpoints. The security assessments existing in a particular computing environment function to provide a security context that gives an ESAS-enabled endpoint a new way to look at its own locally-available information. The security context enables an ESAS-enabled endpoint to combine or correlate evidence from security assessments received from a variety of different sources, and across object types, in order to significantly enhance the quality of its detection of potential security incidents and reduces the level of false-positive and false-negative identifications of security incidents in the environment. In addition to implementing in hardware some or all of ESAS functionality that is typically provided by software, the Direct Access hardware interface may be configured to send and receive security assessments over a defined channel. The channel may comprise a link or use a defined IP address and may further be handled with a particular quality of service ("QoS") to guarantee communication of security assessments even in cases where the network is congested. The Direct Access hardware can thus extend the advantages and benefits of ESAS to users who are outside the enterprise network while also increasing the number of ESAS-enabled endpoints that are available to detect potential security threats.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements in the drawings are not drawn to scale unless otherwise indicated.

DETAILED DESCRIPTION

Figure 1:
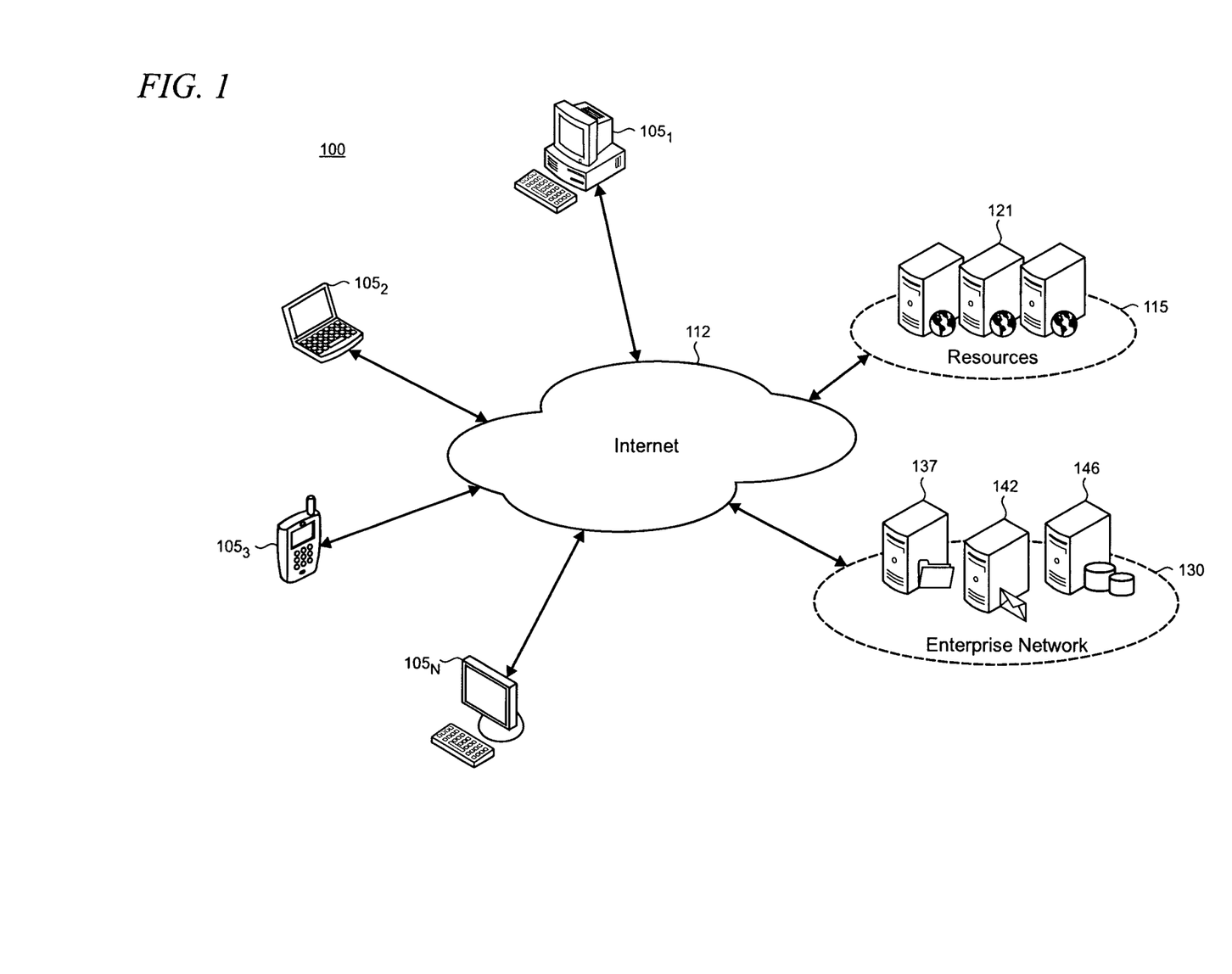
FIG. 1 shows an illustrative networked computing environment in which the present hardware interface may operate.

FIG. 1 shows an illustrative networked computing environment 100 in which the present hardware interface may operate. In this example, client devices $105_{1, 2 \ldots N}$ such as a personal computer ("PC") $105_1$, laptop computer $105_2$, mobile information appliance $105_3$, and a non-Windows® operating system-based computer $105_N$ utilize a network such as the Internet 112 to access resources 115 such as web servers 121, or establish remote access to an enterprise network 130. Users of the client devices 105 may seek remote access to services, files and/or data that is provided by servers in the enterprise network 130 such as a file server 137, an e-mail server 142, and a database server 146, for example.

Figure 2:
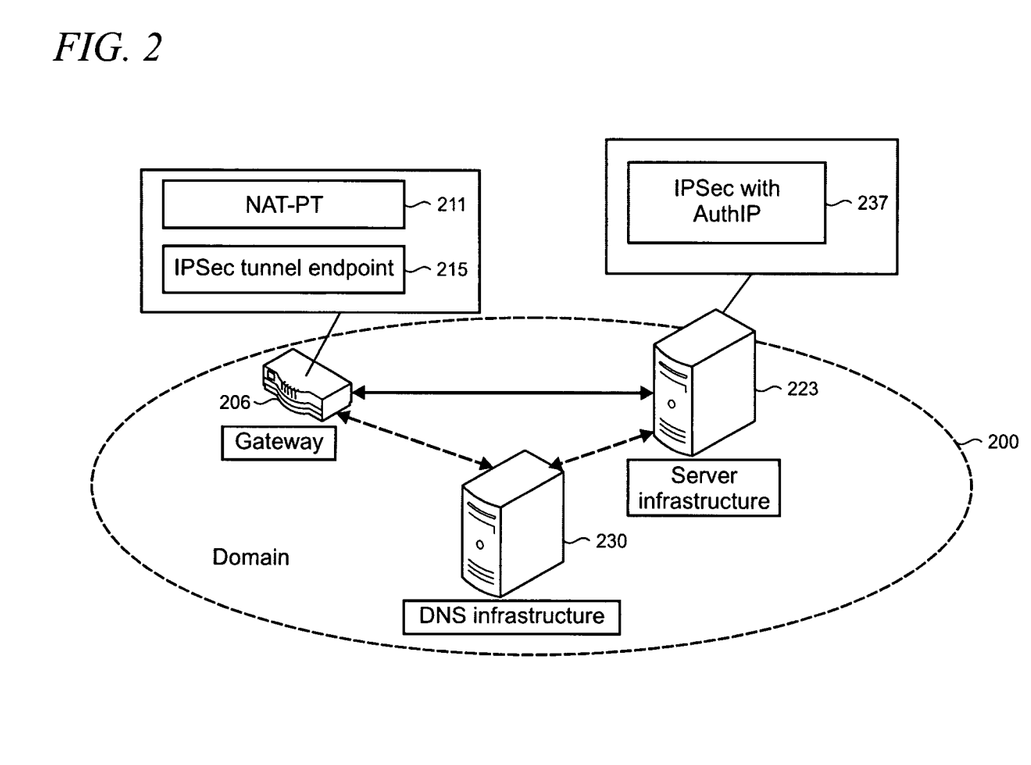
FIG. 2 shows details of a typical implementation of a node in the networked computing environment in which a gateway provides NAT-PT (Network Address Translation-Protocol Translation) and IPsec tunneling functionality.

FIG. 2 shows details of a typical implementation of a node or domain 200 in the networked computing environment in which a gateway 206 supports a NAT-PT (Network Address Translation-Protocol Translation) component 211 and IPsec tunnel endpoint component 215. Such gateway 206 is commonly utilized to provide Direct Access capability to native IPv4 server infrastructure 223 that may be utilized to support the Internet-based resources 115 or enterprise network 130 shown in FIG. 1. As noted above, the term "Direct Access" is used to define IPv6 capability using IPsec, including IPsec-NAP in some implementations.

The NAT-PT component 211 functions as a migration tool to enable the operator of the domain 200 to transition IPv4 networks to IPv6 networks. By placing NAT-PT functionality in the gateway 206, an endpoint in an IPv6-only node can connect with the server infrastructure 223 in the IPv4-only node. The NAT-PT component 211 also supports an Application Layer Gateway ("ALG") functionality to enable domain name-to-address mapping in the DNS infrastructure 230 that is typically provided in the domain 200. Specifically, the ALG provides the ability to resolve IPv6 addresses into DNS queries and responses into their IPv4 address bindings and vice versa, as DNS packets traverse between the IPv4 and IPv6 networks. This additional complexity is caused by the inability of the server infrastructure 223 to register with the DNS infrastructure 230 as a native IPv6 server.

The IPsec tunnel endpoint component 215 enables the gateway 206 to terminate an IPsec connection. An IPsec tunnel uses an encrypted IP header and payload during transit. In this way, the tunnel provides protection for the entire packet. An entire IP packet is first encapsulated, for example, with an authentication header or encapsulating security payload header, and then the result is encapsulated with an additional IP header. The additional IP header contains the source and destination of the tunnel endpoints. After the packet reaches the first destination at the tunnel endpoint, it can be decapsulated and sent to the final destination by reading the IP address.

NAP functionality will typically be implemented using both client and server components that allow the creation and enforcement of health requirement policies that define the required software and system configurations for computers that connect to a given network. NAP enforces health requirements by inspecting and assessing the health of client computers, limiting network access when client computers are deemed noncompliant, and remediating noncompliant client computers for unlimited network access. NAP enforces health requirements on client computers that are attempting to connect to a network. NAP can also provide ongoing health compliance enforcement while a compliant client computer is connected to a network.

In some implementations, the server infrastructure 223 will also employ a NAP server-side component that is implemented in this example as a derivative of IPSec known as IPsec with AuthIP, or authenticated IP (as identified by reference numeral 237). This functionality is supported in recent releases of Microsoft Windows operating systems and provides simplified IPSec policy configuration and maintenance in many configurations and additional flexibility for IPsec peer authentication. In particular, the IPsec with AuthIP component 237 is configured to verify the NAP certificate on the server 223.

Figure 3:
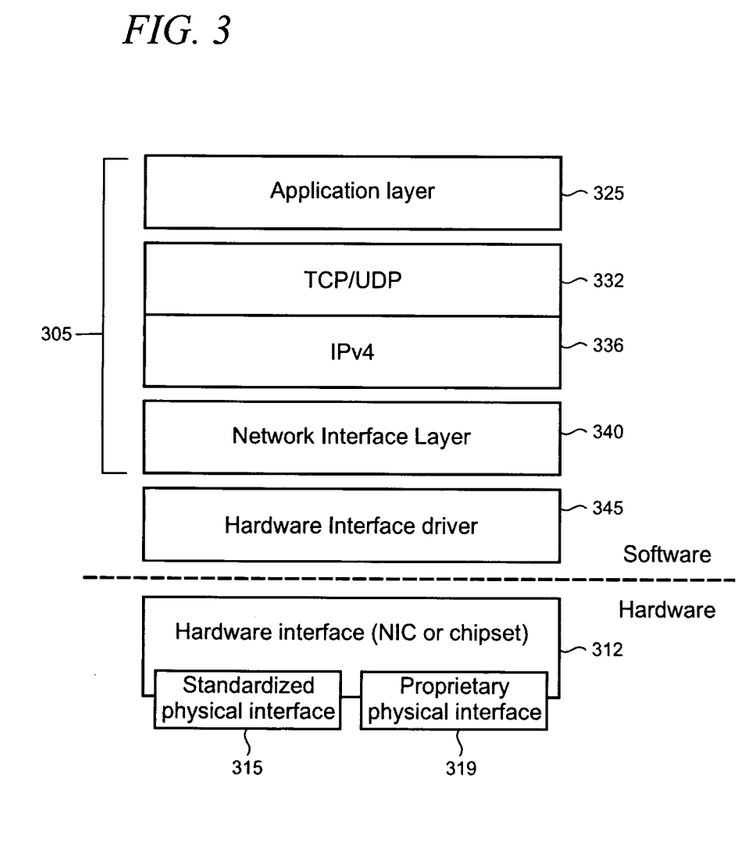
FIG. 3 shows an illustrative software protocol stack and hardware interface that may be utilized in an endpoint.

FIG. 3 shows an illustrative software protocol stack 305 and hardware interface 312 that may be utilized in a non-Direct Access-ready endpoint to enable it with Direct Access capabilities. An endpoint may include a client computer, mobile information appliance (such as mobile phone, smart phone, PDA, pocket PC, handheld game device, media player, etc.), server, or intermediate network device such as a gateway, router, switch, etc. In this example, the hardware interface 312 may be alternatively implemented as a network interface card ("NIC") or as a chipset. When implemented as a NIC, the hardware interface will typically interface with an endpoint over a standardized physical interface 315 such as those employing a PCI, PCI-X, or PCI Express bus. When implemented as a chipset, the hardware interface will typically physically interface with an endpoint using a device-specific or proprietary interface 319.

As shown in FIG. 3, the software protocol stack 305 on the endpoint includes an application layer 325 that interacts with a transport layer 332 that supports protocols such as TCP and UDP (User Datagram Protocol). An IPv4 internet layer 336 implements data transport through network interface layer 340. A hardware interface driver 345 provides the necessary abstraction of the hardware interface 312 to the protocol stack 305.

Figure 4:
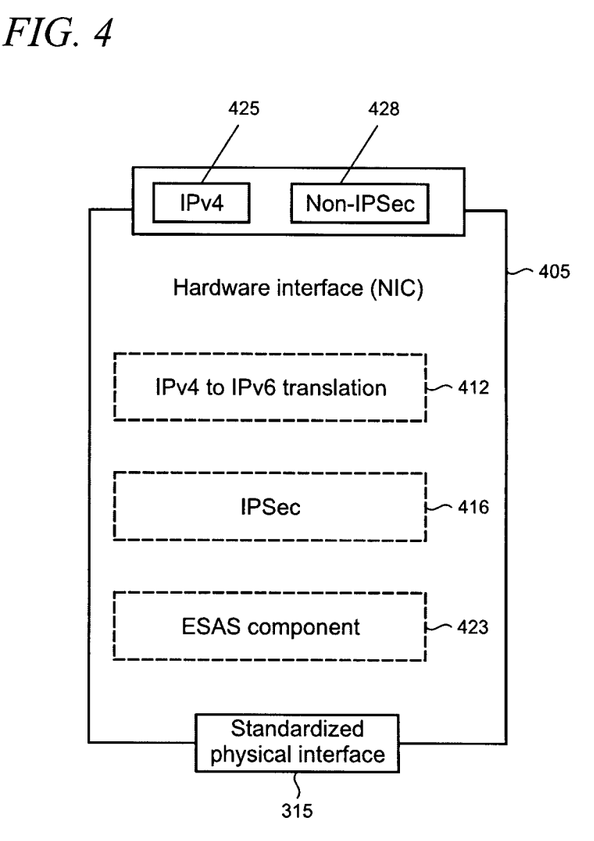
FIG. 4 shows the functional components of an illustrative hardware interface that may be implemented as a network interface card.

FIG. 4 shows the functional components of an illustrative hardware interface when implemented as a NIC 405. The components may be optionally utilized in various combinations, as indicated by the dashed rectangles, depending on the requirements of a particular implementation. For example, in some implementations, only IPsec is needed if the operating system already supports IPv6. Or in others, direct access may not be needed and the NIC 405 is utilized to provide only ESAS functionality. This could occur, for example, in cases when the NIC 405 is installed in a device like a switch or router.

The components include a translation component 412 and an IPsec component 416. The translation component 412 provides translation from IPv4 to IPv6 as well as an ALG functionality to make modifications to the DNS registry. The IPsec component 416 enables termination of IPsec connections. In this example, the IPsec component 416 is implemented to include NAP enforcement (i.e., component 416 supports IPsec-NAP). The hardware NIC 405 thus provides non-Direct Access-ready interfaces (i.e., IPv4 and non-IPsec interfaces as respectively indicated by reference numerals 425 and 428) to provide interoperability without modification to the endpoint in which it is installed while enabling native IPv6 capability.

Figure 10:
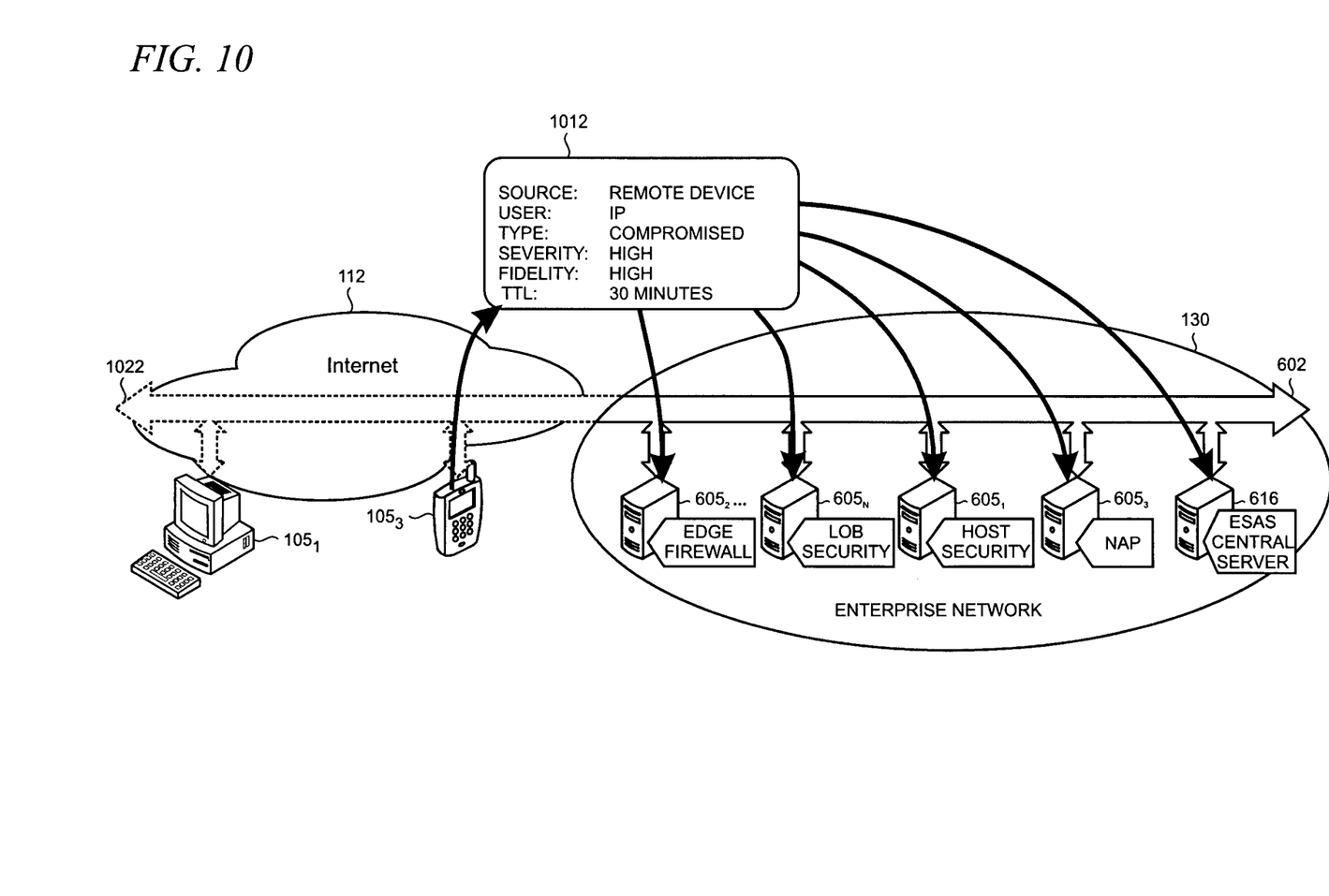
FIG. 10 shows an illustrative arrangement in which an ESAS security assessment channel may be extended from an enterprise network over a non-secure network such as the Internet to one or more endpoints that are ESAS-enabled through use of the present hardware interface.
Figure 11:
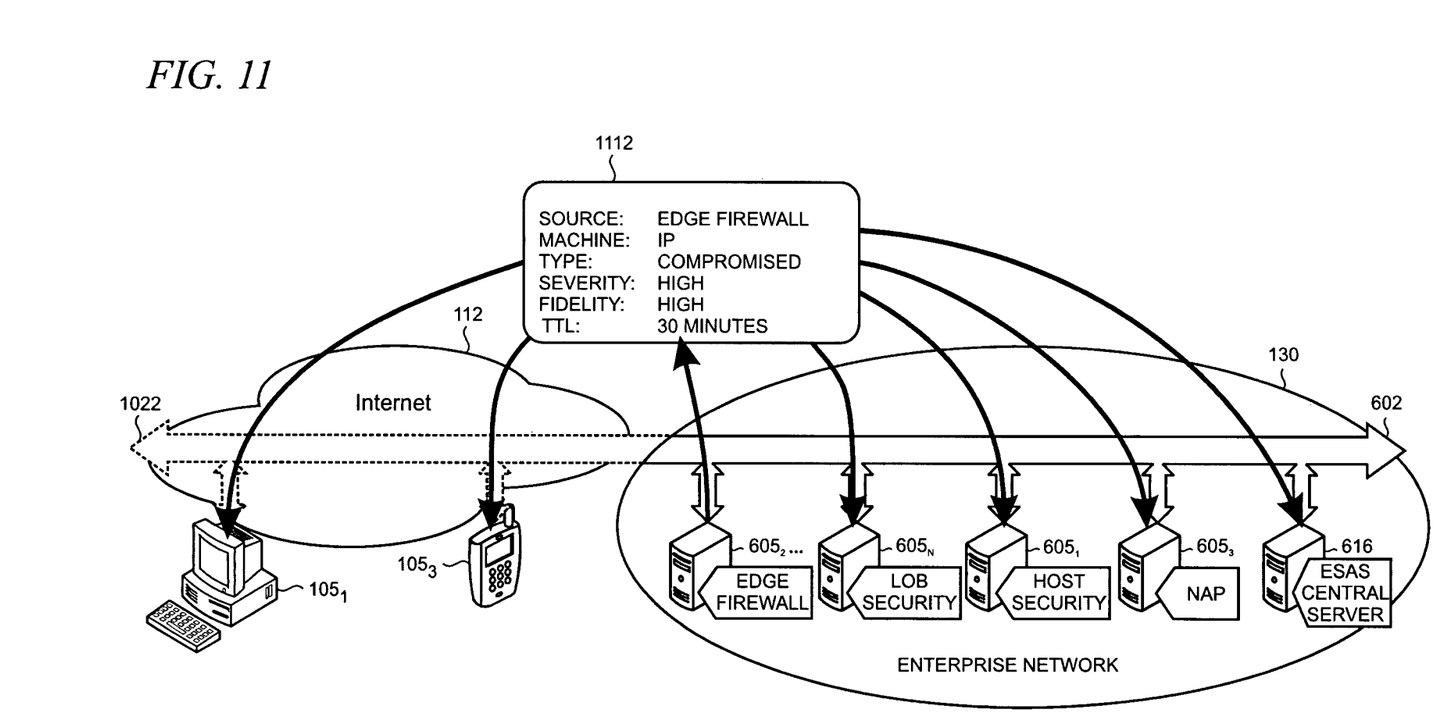
FIG. 11 shows an illustrative extended ESAS architecture in which a security assessment is received by a remote endpoint that is ESAS-enabled through the present hardware interface.

The NIC 405 further includes an ESAS component 423 which provides Enterprise Security Assessment Sharing capabilities to an endpoint in which the NIC 405 is installed. The ESAS component 423 may implement some or all of the ESAS functionality in hardware that is typically provided by software. Illustrative ESAS scenarios which utilize an endpoint having an installed NIC with ESAS capability are shown in FIGS. 10-11 and described in the accompanying text.

Figure 5:
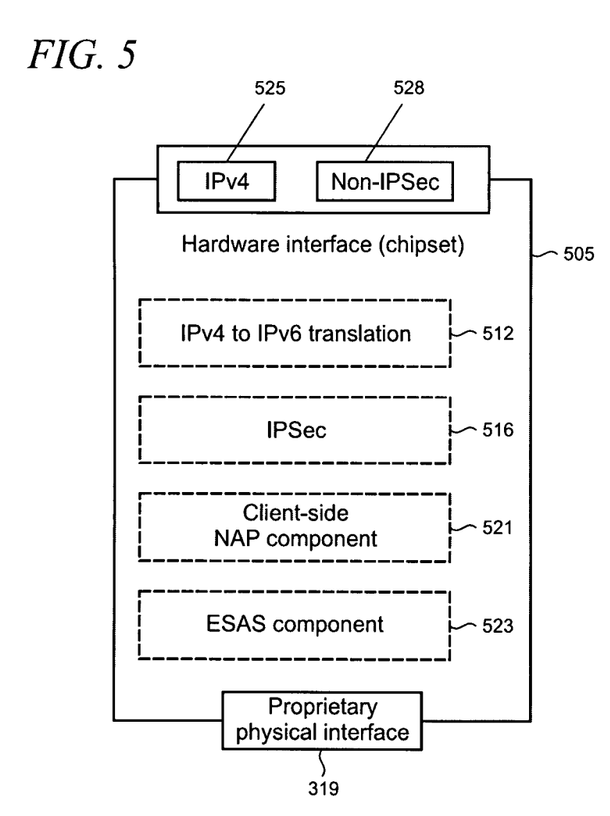
FIG. 5 shows the functional components of an illustrative hardware interface that may be implemented as a chipset.

FIG. 5 shows the functional components of an illustrative hardware interface when implemented as a chipset 505. As with the components shown in FIG. 4, the components in FIG. 5 may be optionally utilized in various combinations. The components include a translation component 512 and an IPsec component 516 that are arranged with similar features and functionalities as their counterparts shown in FIG. 4 and described in the accompanying text. The chipset 505 also includes a client-side NAP component 521. The client-side NAP component 521 may be used, for example, in client device applications such as with mobile information appliances that are not currently provided with NAP capabilities. As with the hardware NIC 405, the hardware chipset 505 provides non-Direct Access-ready interfaces (i.e., IPv4 and non-IPsec interfaces as respectively indicated by reference numerals 525 and 528) to provide interoperability without modification to the endpoint in which it is installed while enabling native IPv6 capability.

It is noted that both the NIC 405 and chipset 505 may be alternatively implemented using a "dual stack" arrangement in which both IPv4 and IPv6 are supported. In this implementation, either separate IPv4 and IPv6 network stacks may be used, or more typically, the stacks will share some common code. Dual stack arrangements are described, for example, in RFC 4213 and are often used to provide transition mechanisms between IPv4 and IPv6 so that endpoints in a system can still be accessed using solely IPv4 if needed. It is further noted that the NIC 405 and chipset 505 may be configured to interoperate with either Direct Access clients or Direct Access servers as needed to meet the requirements of a particular implementation.

The chipset 505 further includes an ESAS component 523 which provides Enterprise Security Assessment Sharing capabilities to an endpoint in which the chipset 505 is installed. The ESAS component 523 may implement some or all of the ESAS functionality in hardware that is typically provided by software. Illustrative ESAS scenarios which utilize an endpoint having an installed NIC with ESAS capability are shown in FIGS. 10-11 and described in the accompanying text.

An illustrative example in which an ESAS arrangement is implemented using the present hardware interface now presented. In an enterprise computing environment, for example, an office of a business, a number of personal computers, workstations, servers and the like, along with other devices such as mass storage subsystems, internal network interfaces, and external network interfaces, are typically interconnected to provide an integrated environment in which information may be generated, accessed from external sources, and shared among various users. Commonly, users perform a variety of operations including order receipt, manufacturing, shipping, billing, inventory control, document preparation and management, e-mail, web browsing, and other operations in which creation, access, and sharing of data is beneficial.

Currently, security is typically provided for an enterprise using a variety of different security products that are each normally arranged to monitor only a partial portion of enterprise-wide data. That is, security products are arranged as separate local "islands" where each product monitors, assesses, and takes action with respect to different parts of the data within the enterprise. For example, the host security product, edge firewall product, NIDS product, NAP product, and other discrete security products typically provide security for the various different parts of the enterprise.

While these security products often perform satisfactorily in many applications, detection of security incidents often suffers from undesirably high levels of false-positive and false-negative occurrences as a result of the monitoring of only partial enterprise security data. It has also been difficult to provide effective common management across all the enterprise security product islands. Current attempts to correlate enterprise-wide security data have high management and maintenance costs and have problems in scaling. Accordingly, ESAS provides a single enterprise-wide view to enable security administrators to define and enforce clear, simple, and unified enterprise-wide policies for automatic responses to security incidents.

As noted above, ESAS relies upon a semantic abstraction, called a security assessment that enables sharing of security-related information between different security products, called security endpoints, in an enterprise security environment. A security assessment is defined as a tentative assignment by a security endpoint of broader contextual meaning to information (i.e., data in some context) that is collected about an object of interest in the environment such as a computer, user, service (e.g., a website), data, or the enterprise as a whole. The security assessment utilizes a concise vocabulary for a security endpoint to declare that an object in the environment falls into a particular assessment category such as "compromised" or "under attack" along with the severity (e.g., low, medium, high, critical) of the detected incident.

A security assessment is tentative because it is subject to some uncertainty and is valid for a limited period of time. The tentative nature of a security assessment is reflected in two of its components: a fidelity field which expresses the level of confidence the security endpoint has in its assignment of contextual meaning, and a time-to-live ("TTL") field which reflects the security endpoint's estimate of the time period for which the security assessment is expected to be valid. Thus, for example, a security assessment may be used by a security endpoint to declare, in light of that security endpoint's current understanding of one or more security incidents, that a particular machine is compromised, with a critical level of severity, with medium fidelity, and having a TTL of 30 minutes. A variety of types of security assessments may be used in any given enterprise security environment having, for example, various combinations of assessment category and object type.

Security endpoints are enabled with functionality to publish security assessments onto a security assessment channel operating in the environment, as well as subscribe to a subset of available security assessments published by other security endpoints. The security assessments existing in the environment that are active (i.e., those having a TTL which indicates the assessments are still valid) function to provide a security context that gives such an ESAS-enabled endpoint a new way to look at its own locally-available information. That is, the security context enables the ESAS-enabled endpoint to combine or correlate evidence from security assessments received from a variety of different sources, and across object types, in order to significantly enhance the quality of its detection of potential security incidents. The ESAS-enabled endpoint then makes a decision as to what local action or response is appropriate for each type of security assessment (whether received from another security endpoint or internally generated by the security endpoint itself) in accordance with a set of response policies. Incident detection is both efficient and cost-effective because the security context enables distributed processing of enterprise-wide information, in the form of security assessments, without the burden of sharing large amounts of raw data throughout the enterprise (most of which is completely irrelevant due to the lack of any context). ESAS-enabled endpoints are further arranged to roll back the local action upon expiration of the security assessment that prompted the local action (i.e., when the security assessment exceeds the time-to-live specified in the TTL field).

In most typical ESAS implementations, a specialized security endpoint called an ESAS central server is utilized. The ESAS central server is coupled to the security assessment channel and performs as a centralized audit point by subscribing to all security assessments, logging the security assessments, and also logging the local actions taken by security endpoints in response to security incidents in the environment. The ESAS central server provides administrators with a comprehensive view of the history and current status of the enterprise as a whole and of each ESAS-enabled endpoint. The utilization of the security assessments enables an administrator to compactly and efficiently configure response policies to incidents that are detected across the entire enterprise. The security assessments function as natural anchors, or starting points, to define enterprise-wide security response policies. A streamlined and consistent management interface is thus enabled to define the desired responses for each type of security assessment across the entire enterprise.

The ESAS arrangement provides a number of advantages. By employing a security assessment having a concise vocabulary, overall data complexity in the enterprise is drastically reduced and only meaningful information is shared between security endpoints. Use of the security assessment also eliminates the need to collect large amounts of raw data in a central storage location, and thereby enables highly scalable enterprise security solutions to be built on a very cost effective basis. In addition, a new security endpoint may be readily deployed with on-demand extensibility. Security assessments may be shared between the new security endpoint and existing security endpoints without the need to reconfigure any of the response policies within existing security endpoints. The new security endpoint simply functions as a new source of security assessments using a semantic abstraction that the existing security endpoints already understand. The utilization of security assessments also enables enterprise-wide security policies to be established using a very compact and clear methodology, without needing to understand all of the possible security events that every security endpoint may generate in the enterprise, and then try to describe the responsive action for each event.

Figure 6:
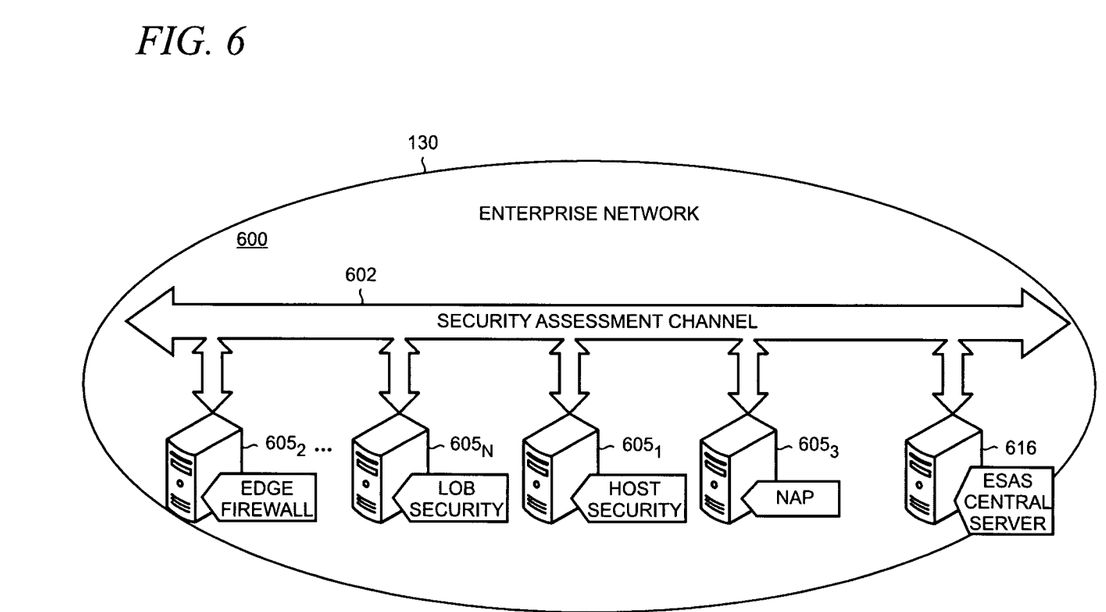
FIG. 6 shows an illustrative enterprise security assessment sharing ("ESAS") arrangement in an enterprise network.

Turning now to FIG. 6, an illustrative ESAS arrangement 600 deployed in the enterprise network 130 is shown in which a security assessment channel 602 is provided to enable a security assessment to be shared among multiple security endpoints using a language/protocol that is commonly-utilized at each security endpoint. The security assessment channel 602 facilitates a publish/subscribe model used by the security endpoints for connecting the sources of security assessments (publishers) to the consumers of the security assessments (subscribers). As shown, both the publishers and subscribers on the security assessment channel 602 are security endpoints 605.

The security endpoints 605 are isolated from the mechanics of the actual transport and management of the publish/subscribe model through a semantic abstraction layer that is arranged to simplify interactions with the security assessment channel 602. The abstraction layer comprises tables describing the security assessment types to which the security endpoints subscribe, and tables describing the security assessment types that security endpoints publish (as described below, not all security endpoints generally subscribe to all security assessment types). In addition, the abstraction layer provides an API (application programming interface) for reading received security assessments, and an API for generating security assessments.

A specialized security endpoint, ESAS central server 616, is coupled to the security assessment channel 602 and performs as a centralized audit point for the ESAS arrangement 600. Accordingly, the ESAS central server 616 subscribes to all security assessments and permanently logs them. ESAS central server 616 also receives and logs messages from the security endpoints that indicate the local actions that are taken by a security endpoint. The ESAS central server 616 thus provides administrators with security assessment monitoring functionality that gives a comprehensive view of the history and current status of the enterprise as a whole, as well as each ESAS-enabled endpoint.

Figure 7:
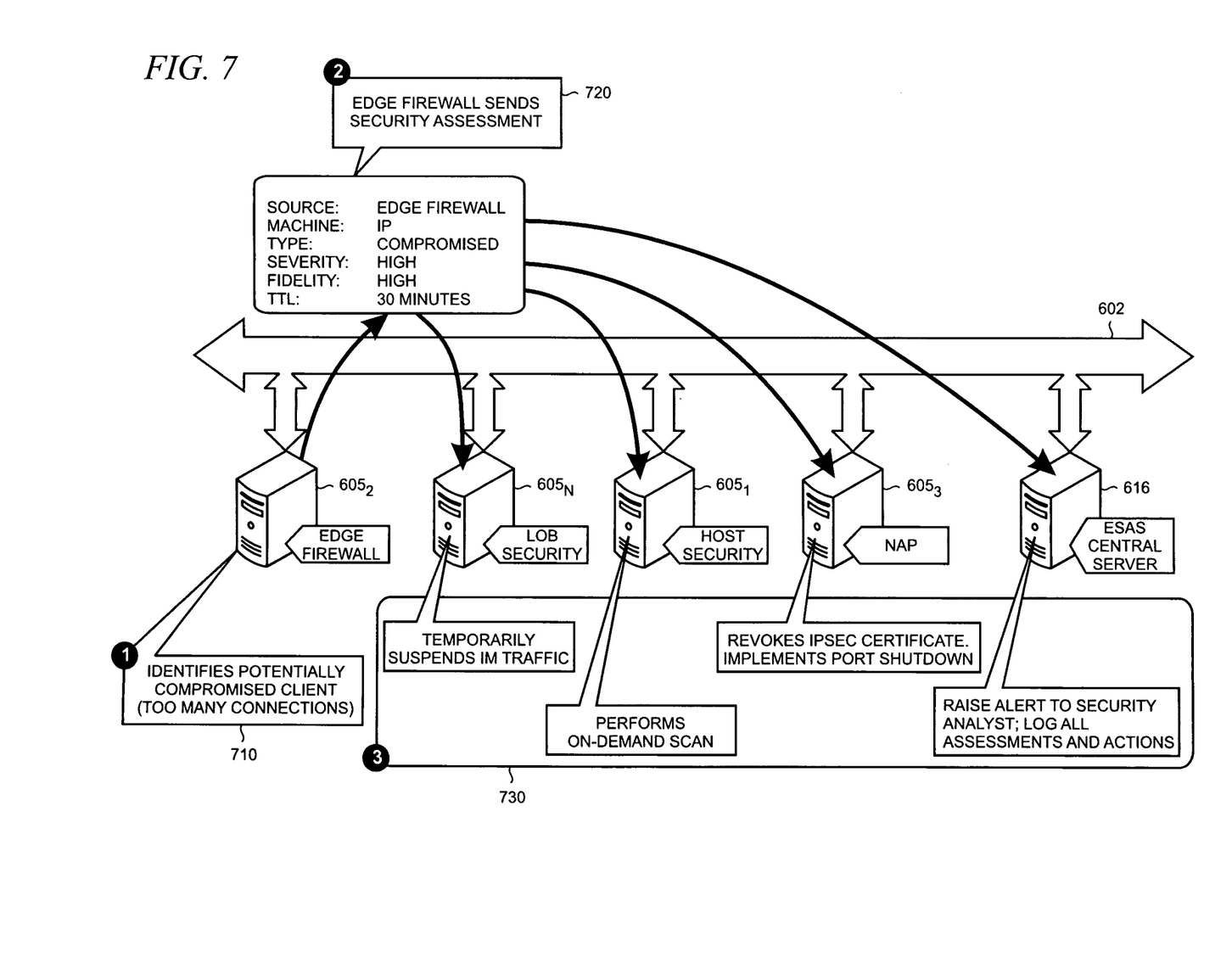
FIG. 7 is a diagram of a first illustrative scenario in which a plurality of ESAS-enabled endpoints are coupled to a security assessment channel and a detected incident at one endpoint triggers responses at multiple other endpoints.

FIG. 7 is a diagram of a first illustrative scenario in which a plurality of ESAS-enabled endpoints are coupled to the security assessment channel 602, and a detected incident at one security endpoint triggers responses at multiple other security endpoints. This illustrative scenario is described in three stages. As indicated by reference numeral 710, the edge firewall $605_2$ first identifies a potentially compromised client, for example, because it creates so many connections to the perimeter of the enterprise network 130 that the most likely explanation for the behavior is the existence of a security compromise. Second, the edge firewall $605_2$ sends a security assessment that indicates the particular client is "compromised" with high severity and high fidelity, as indicated by reference numeral 720, over the security assessment channel 602 to subscribing security endpoints.

Third, the subscribing security endpoints $605_{1, 2, 3 \ldots N}$ and the ESAS central server 616 which receive the security assessment apply their specific security expertise through the application of their own correlation rules and locally-available data to trigger an appropriate action. As collectively indicated by reference numeral 730 in FIG. 7, the host security endpoint $605_1$ performs an on-demand scan. The NAP endpoint $605_3$ revokes the IP security certificate for the identified compromised client and implements a port shutdown. The line-of-business security endpoint $605_N$ temporarily suspends instant messaging ("IM") traffic to the compromised client based on the received security assessment. The ESAS central server 616 raises an alert for a security analyst (e.g., an administrator) and also logs all of the security assessments and actions invoked.

Figure 8:
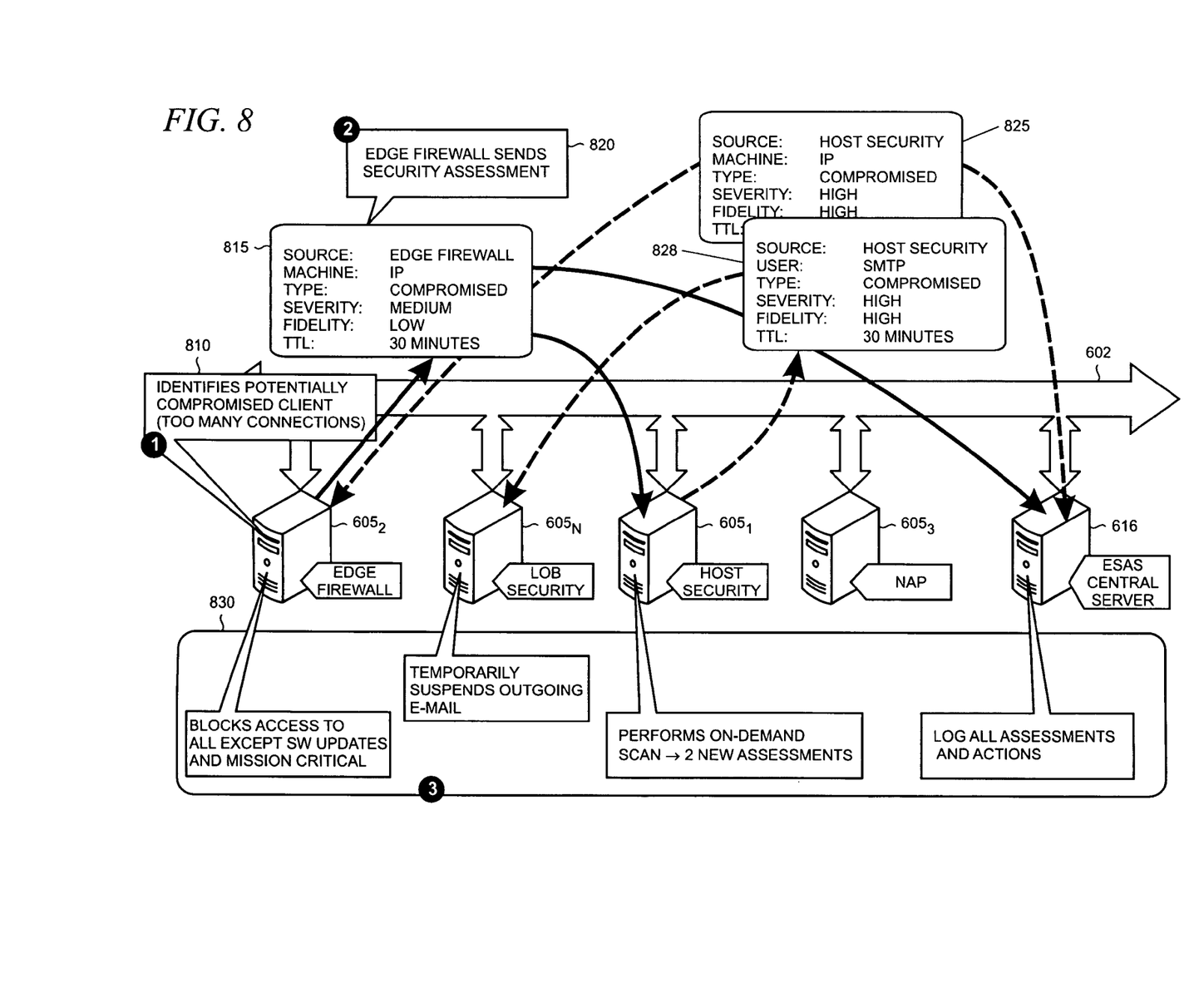
FIG. 8 is a diagram of a second illustrative scenario in which a low fidelity security assessment is sent over the security assessment channel that triggers the generation of a new high fidelity assessment by a receiving ESAS-enabled endpoint which also performs cross-object mapping.

The first illustrative scenario described above provides a case where the security endpoint detecting the suspicious incident generates a security assessment with high severity and high fidelity (i.e., the security endpoint has a high degree of confidence that it has validly detected a serious incident). By comparison, FIG. 8 is a diagram of a second illustrative scenario in which a low fidelity security assessment is sent over the security assessment channel 602 that triggers the generation of a high fidelity assessment by a receiving security endpoint which also performs cross-object mapping.

This second illustrative scenario is also described in three stages. As indicated by reference numeral 810, the edge firewall $605_2$ first detects a large number of client connections to a perimeter of the enterprise network 130. However, unlike the first illustrative scenario shown in FIG. 7 and described in the accompanying text, the number of connections being established by the client is not so high that the edge firewall $605_2$ can be absolutely certain that the client has been compromised. In current enterprise security systems, when a security endpoint sees such data it generally just drops the data and takes no action as there is not enough evidence to warrant the typically harsh response such as disconnecting the machine. By comparison, in the present scenario, the edge firewall $605_2$ in the second stage sends a security assessment 815 over the security assessment channel 602 that indicates that the particular client is compromised with medium severity and low fidelity, as indicated by reference numeral 820.

Here, the subscribing security endpoints to the particular object referenced in the security assessment 815 generated by the edge firewall $605_2$ include the host security endpoint $605_1$ and the ESAS central server 616. While such a low fidelity data normally does not trigger an action to be taken at a security endpoint in current security products, in accordance with the present enterprise security assessment sharing, the host security endpoint $605_1$ looks at its own local data differently in light of the received security assessment from the edge firewall $605_2$. In this case, the local data resulting from an on-demand scan at the host security endpoint $605_1$ and the information contained in the security assessment from the edge firewall $605_2$ are used to generate new assessments 825 and 828. Thus, the host security endpoint $605_1$ has information that, by itself, does not warrant the generation of a new security assessment, but when reinforced with even a low fidelity assessment from another security endpoint, as in this case, there is sufficient evidence to justify the creation of the new security assessments 825 and 828 which each have high fidelity.

The host security endpoint $605_1$ places the new security assessments 825 and 828 onto the security assessment channel 602. The new security assessments 825 and 828 are received over the security assessment channel 602 by the subscribing security endpoints which, in this illustrative scenario, include the edge firewall $605_2$, and the ESAS central server 616 for security assessment 825 and line-of-business endpoint $605_N$ for security assessment 828.

Note that the line-of-business endpoint $605_N$ was not a subscriber to the original security assessment 815 produced by the edge firewall $605_2$ because the reference object type is a machine and the line-of-business endpoint $605_N$, by virtue of its role in protecting e-mail, is typically concerned with the users. However, in this second illustrative scenario the host security endpoint $605_1$ maps from a host object type to a user object type when it generates a new security assessment 828. Such cross-object mapping capability may be beneficial in many scenarios as it is contemplated that a high severity incident, such as malware or malicious activity that potentially compromises the data confidentiality or integrity of a host computer, may also potentially compromise the user as well. A security assessment may be generated that cross-maps the high severity incident from the host object type to a user object type with a certain degree of fidelity. Similarly, for a critical severity incident in which malware or malicious activity has actually caused a loss of data integrity on a host computer, a security assessment for a user object type may be generated with even higher fidelity.

In stage three, the new security assessments 825 and 828 trigger a variety of respective actions at the receiving security endpoints, as collectively indicated by reference numeral 830. Specifically, the edge firewall $605_2$ blocks all access by the compromised client with the exception of software updates and/or mission-critical access. The line-of-business endpoint $605_N$ temporarily suspends outgoing e-mails. And, as with the first illustrative scenario, the ESAS central server 616 continues to log all assessments and actions. As noted above, such restrictions are enforced only during the period of time for which the TTL associated with the new security assessments 825 and 828 remains valid. When the new security assessments expire, the actions taken by the respective security endpoints are rolled back unless the TTL is extended or a new security assessment which invokes the restrictive actions is received.

Figure 9:
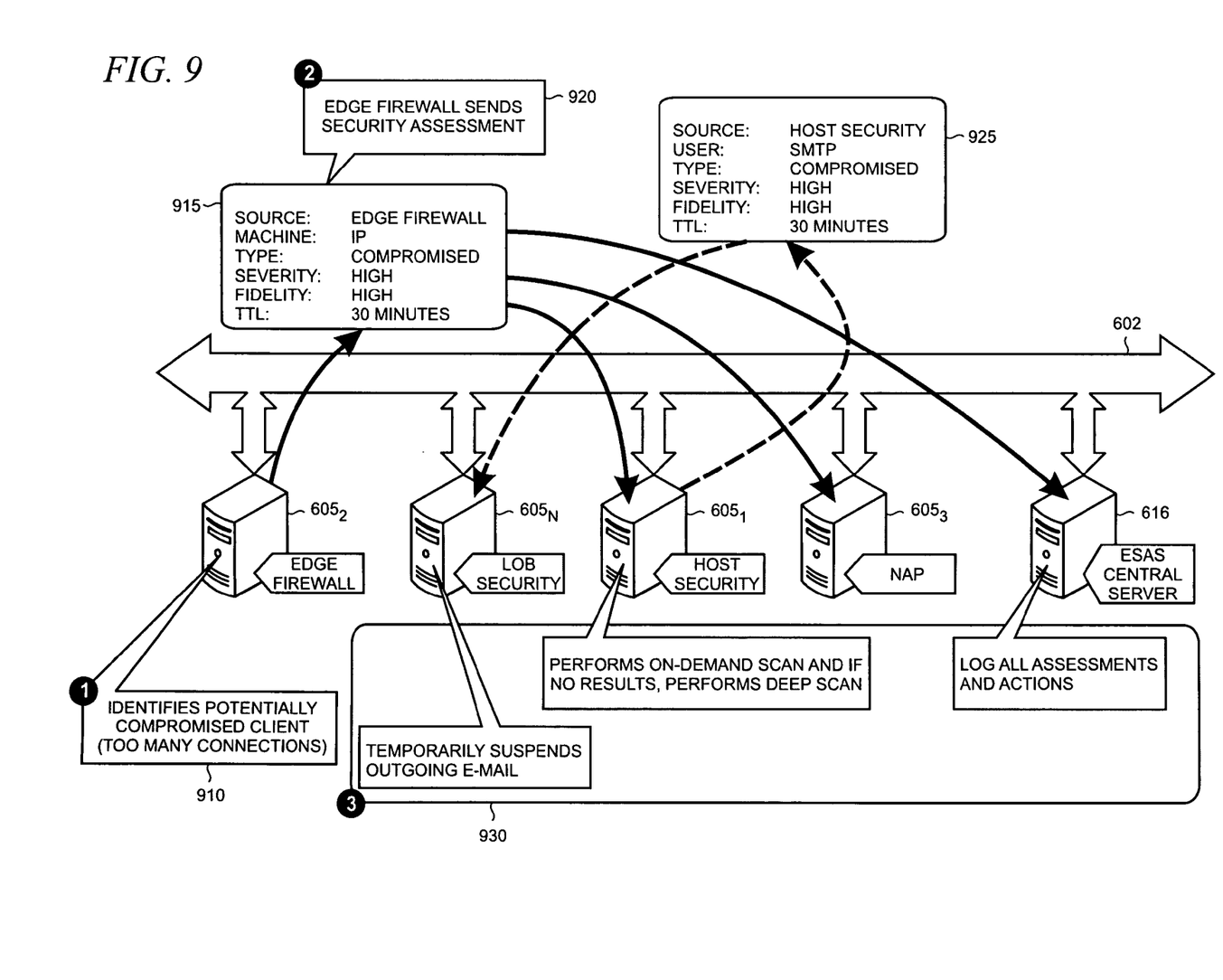
FIG. 9 is a diagram of a third illustrative scenario that shows the targeted use of remediation techniques.

FIG. 9 is a diagram of a third illustrative scenario that shows the targeted use of remediation techniques. This third illustrative scenario is described in three stages. As indicated by reference numeral 910, the edge firewall $605_2$ first detects a large number of client connections to the perimeter network. Second, the edge firewall $605_2$ sends a security assessment 915 that indicates the particular client is "compromised" with high severity and high fidelity, as indicated by reference numeral 920, over the security channel 602 to subscribing security endpoints. The subscribing security endpoints include the host security endpoint $605_1$ the NAP endpoint $605_3$ and the ESAS central server 616.

The host security endpoint $605_1$ reviews the received security assessment and applies its specific security expertise using correlation rules and any relevant locally-available data. In this illustrative example, the host security endpoint $605_1$ responsively generates a new security assessment 925 containing a user object type to which the line-of-business security endpoint $605_N$ subscribes.

In the third stage of the scenario, the remediation techniques employed by the security endpoints are considered expensive in terms of their potential impact on business operations within the enterprise network 130. For example, as indicated by reference numeral 930, the line-of-business security endpoint $605_N$ implements a response policy that entails temporarily suspending outgoing e-mail. In addition, the host security endpoint $605_1$ performs an on-demand scan and if no results are achieved, performs a deep scan. While such remediation techniques can be very effective in addressing malware, malicious users, and other problems, they typically impart significant expense to the enterprise. For example a user whose outgoing e-mail is suspended will be less productive, and deep scanning typically requires one or more reboots which will remove the machine from service for a period of time.

The ESAS arrangement advantageously enables these effective, albeit expensive, remediation techniques to be applied in a targeted manner and not merely in a general way or across-the-board which can be unjustified for some machines and/or users. Only objects in the environment that are deemed suspicious, using pre-defined criteria, will be subject to these particular remediation techniques.

FIG. 10 shows an illustrative arrangement in which an ESAS security assessment channel may be extended from the enterprise network 130 over a non-secure network such as the Internet 112 to an endpoint that is ESAS-enabled through use of the present hardware interface. In this example, the PC $105_1$ utilizes a Direct Access-ready client NIC 405 while a mobile information appliance $105_3$ uses a Direct Access-ready client chipset 505. Both the NIC 405 and chipset 505 use the optionally-utilized ESAS component which implements ESAS capability in hardware in this example. While client devices 105 are shown as being equipped with ESAS capability in FIG. 10, it is emphasized that any of a variety of devices in a networking environment may be configured to include the present hardware interface with ESAS including servers and intermediate network devices such as routers, gateways, switches, and the like.

As shown in FIG. 10, security software running on the mobile information appliance $105_3$ detects a security incident such as a website that appears to be a phishing site. It can then publish a security assessment 1012 through the extended ESAS security assessment channel (indicated by reference numeral 1022) which is received by subscribing security endpoints 605 in the enterprise network 130. The chipset 505 in the mobile information appliance $105_3$ may be configured to send and receive security assessments over a defined channel. For example, the channel may comprise a link or use a defined IP address and may further be handled with a particular QoS to guarantee communication of security assessments even in cases where the Internet 112 is congested.

As shown in FIG. 11, the extended ESAS security assessment channel 1022 supports the receipt at the devices 105 of security assessments that are published by the security endpoints 605 in the enterprise network 130. As shown, a security assessment 1112 published by the edge firewall $605_2$ is received by the PC $105_1$ and the mobile information appliance $105_3$. The receipt of the security assessment may trigger local responses by the client devices 105 in a manner that is similar to that described above in the text accompanying FIGS. 7-9.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network interface card arranged for enabling Direct Access when installed in a host endpoint in an enterprise network, comprising:

An IPv4 to IPv6 translation component for providing IPv4 to IPv6 translation for data traffic that is incoming to the network interface card;

an IPsec component arranged for terminating an IPsec connection; and an enterprise security assessment sharing component (ES-ASC) arranged for implementing a security assessment publish and subscribe model in hardware for sharing security assessments among security endpoints that subscribe to the (ESASC) so that they are available to other security endpoints, wherein each security assessment for each security endpoint is published onto a security assessment channel, a security assessment being a semantic abstraction of security related information that provides contextual meaning to a security incident that occurs within an enterprise network environment such that the security assessments received by any one of the security endpoints from any other security endpoints can be combined or correlated with evidence generated by the one security endpoint itself to determine and initiate a local response.

2. The network interface card of claim 1 further including a standardized physical interface.

3. The network interface card of claim 1 further including a client-side NAP component that provides NAP capabilities to client devices in which the network interface card is installed.

4. The network interface card of claim 1 in which the IPv4 to IPv6 translation component is further arranged with an ALG functionality to perform modifications to a DNS registry.

5. The network interface card of claim 1 in which the enterprise security assessment sharing component is further arranged for defining a time interval over which the security assessment is valid.

6. The network interface card of claim 1 in which the enterprise security assessment sharing component is further arranged for receiving security assessments about security incidents detected by the network endpoints.

7. The network interface card of claim 1 in which the enterprise security assessment sharing component is further arranged for rolling back a local response when a received security assessment is no longer valid.

8. A chipset arranged for enabling Direct Access when installed in a host device, comprising:

An IPv4 to IPv6 translation component for providing IPv4 to IPv6 translation for data traffic that is incoming to the host device; and an enterprise security assessment sharing component arranged for implementing an enterprise security assessment sharing system in hardware, the system being arranged for implementing a security-related information sharing model by which security-related information is shareable among a plurality of endpoints in an enterprise security environment, the model facilitating use of a method comprising the steps of describing an object in the environment using a semantic abstraction of security-related information that is available to an endpoint, the semantic abstraction i) being categorized by type, and ii) being commonly utilizable by the endpoints to initiate a response to a security incident, and using a publish and subscribe model by which a publishing endpoint publishes the semantic abstraction to which a subscribing endpoint subscribes according to a subscription, the subscription being based on the semantic abstraction type, wherein each semantic abstraction for each endpoint is published onto a security assessment channel.

9. The chipset of claim 8 in which the semantic abstraction is a security assessment that is arranged for providing an assignment of context by an endpoint to the security-related information using a pre-defined taxonomy which utilizes a schematized vocabulary comprising object types and assessment categories.

10. The chipset of claim 8 further including an IPsec component arranged for terminating an IPsec connection.

11. The chipset of claim 10 in which the IPsec component is an IPsec-NAP component.

12. The chipset of claim 10 in which the IPsec component performs IPsec tunneling.

13. The chipset of claim 10 in which the IPsec component implements an IPsec tunneling endpoint.

14. The chipset of claim 8 further including a device-specific physical interface.

15. A network interface card for implementing an enterprise security assessment sharing functionality in hardware that is installable on a host endpoint in an enterprise network, the functionality performing a method comprising the steps of:

generating a security assessment to describe a detected security incident, in which the generating is based at least in part on locally-available information about a system being monitored by the endpoint, the security assessment being a semantic abstraction of security related information that provides contextual meaning to the security incident and specifying a severity of the event and a level of confidence in accuracy of the detection of the security incident;

receiving a current security assessment in accordance with a subscription to a subset of available security assessments generated by other endpoints in the enterprise security environment; and taking a response in accordance with a response policy on a per security assessment basis based on the received current security assessment and the locally-available information.

16. The network interface card of claim 15 as embodied in a network interface card, the network interface card being configured for interoperability with either a Direct Access server or Direct Access client.

17. The network interface card of claim 15 as embodied in a chipset, the chipset being configured for interoperability with either a Direct Access server or Direct Access client.

18. The network interface card of claim 15 further including an IPv4 to IPv6 translation component for providing IPv4 to IPv6 translation for data traffic that is incoming to the interface.

19. The network interface card of claim 15 further including an IPsec component arranged for terminating an IPsec connection at the interface.

* * * * *